United States Patent [19]

Pleva et al.

[11] Patent Number: 5,921,680
[45] Date of Patent: Jul. 13, 1999

[54] SENSOR FOR RADIATION PYROMETRIC TEMPERATURE MEASUREMENT AT HIGH AMBIENT TEMPERATURE

[75] Inventors: Ralf Pleva, Freudenstadt; Harry Pleva, Horb; Wilfried Löbel, Chemnitz, all of Germany

[73] Assignee: Pleva GmbH, Empfingen, Germany

[21] Appl. No.: 08/849,632

[22] PCT Filed: Oct. 13, 1995

[86] PCT No.: PCT/EP95/04038

§ 371 Date: Aug. 22, 1997

§ 102(e) Date: Aug. 22, 1997

[87] PCT Pub. No.: WO96/16318

PCT Pub. Date: May 30, 1996

[30] Foreign Application Priority Data

Nov. 19, 1994 [DE] Germany ............................ 44 41 257

[51] Int. Cl.⁶ .............................. G01J 5/00; H01L 31/18
[52] U.S. Cl. .......................................... 374/121; 374/130
[58] Field of Search .............................. 374/32, 121, 130, 374/131, 132; 437/2–5

[56] References Cited

U.S. PATENT DOCUMENTS

| | | | |
|---|---|---|---|
| 3,809,920 | 5/1974 | Cohen et al. | 374/121 |
| 5,059,543 | 10/1991 | Wise et al. | |
| 5,193,911 | 3/1993 | Nix et al. | 374/121 |
| 5,216,625 | 6/1993 | Rall | 364/557 |
| 5,325,863 | 7/1994 | Pompei | 128/136 |

FOREIGN PATENT DOCUMENTS

| | | |
|---|---|---|
| 3536133 | 4/1987 | Germany . |
| 4102524 | 8/1991 | Germany . |
| 2090418 | 7/1982 | United Kingdom . |

OTHER PUBLICATIONS

Textilbetrieb; April 1981; p.55.

*Primary Examiner*—Vit Miska
*Attorney, Agent, or Firm*—Robert W. Becker & Associates

[57] ABSTRACT

A sensor for radiation pyrometric determination of the temperature of an object has a heat-conducting housing having a heat-transmissive window. At least one thermocolumn, consisting of thermocouples, is arranged in the housing. Each thermocouple consists of wire elements connected to one another. The wire elements consist of materials that are thermo-electrically active relative to one another. A support body is positioned in the housing and has a first end face facing the window. The support body consists of a heat-resistant, heat-insulating material. The support body has first throughbores extending from the end face through the support body. Each first throughbore receives one wire element. The wire elements have a first connecting location facing the window and positioned above the end face of the support body. The first connecting locations are heat radiation-sensitive. The wire elements have a second connecting location positioned in an area shielded from heat radiation, wherein the second connecting locations are comparative connecting locations.

27 Claims, 3 Drawing Sheets

SENSOR FOR RADIATION PYROMETRIC TEMPERATURE MEASUREMENT AT HIGH AMBIENT TEMPERATURE

BACKGROUND OF THE INVENTION

The invention relates to a sensor for radiation pyrometric temperature determination of an object to be measured, especially under conditions of high ambient temperature in the interior of a dryer etc.

With such sensors a contact-free measurement of the surface temperature of an object to be measured, for example, of solid materials, compounds, and products, in hot air dryers and heat treatment devices is possible. With a plurality of sensors, arranged as close as possible to the surface to be measured, the determination of a spacial temperature profile over time of the material to be treated is possible. This, in addition to other process parameters, provides an important prerequisite for optimizing the process course with respect to economic considerations and quality control. Such heat treatment devices are used in the textile industry, paper industry, wood industry, furniture industry and also in the manufacture of sheet rock etc.

It is known to provide a radiation pyrometer external to the device and to observe through openings, i.e., a heat radiation-transmissive window, the object to be measured, respectively, its surface for measuring the temperature. Only when an optical and radiation-transmissive visual connection is provided, is the measurement of sufficient precision. However, when a relatively large distance exists between the object to be measured and the pyrometer, the measurement is considerably disrupted by radiation-absorbing gases, vapors, or aerosols. Further disturbing factors can be the emission degree of the object to be measured with respect to reflection of foreign radiation or, when using windows, their spectral absorption properties. The arrangement of radiation pyrometers requires the installation of a transverse air lock and of cooling devices for preventing condensation and sublimation effects and for heat protection of the pyrometer optics and pyrometer electronic devices. The use of a plurality of pyrometers, as is, for example, necessary for measuring a temperature profile, is therefore hardly economically justifiable because of the expenditure.

It is also known (Textilbetrieb 1981, Vol. 4, page 55), to arrange for the purpose of process control in belt dryers a plurality of simple temperature sensors, for example, in the form of thermoelements along the path adjacent to one another directly in slip contact on the belt, at a short distance thereto or within the exhaust gas stream. This allows a control of the temperature with respect to the temperature trend, however, the temperature course which is important for certain chemical, respectively, physical-chemical processes can not be determined with sufficient precision.

From German patent application 41 02 524 a sensor for radiation temperature measurement in the infrared spectral range is known which in the form of a miniature thermocolumn arrangement that is produced in thin layer technology. This sensor, however, does not withstand the temperatures present within the interior of a heat treatment device. Also, known resistance thermometers (German patent application 35 36 133) can not be used with sufficient precision in the range of high ambient temperature.

It is therefore an object of the invention to provide a sensor for radiation temperature measurement which allows for precise temperature measurement of an object to be measured even for high ambient temperatures in its direct vicinity.

SUMMARY OF THE INVENTION

The sensor for radiation pyrometric determination of the temperature of an object according to the present invention is primarily characterized by:

a heat-conducting housing having a heat-transmissive window;

at least one thermocolumn, comprised of thermocouples, arranged in the housing;

each one of the thermocouples comprised of wire elements connected to one another, the wire elements consisting of materials that are thermo-electrically active relative to one another;

a support body positioned in the housing and having a first end face facing the window;

the support body consisting of a heat-resistant, heat-insulating material;

the support body having first throughbores extending from the end face through the support body;

each one of the first throughbores receiving one of the wire elements;

the wire elements having a first connecting location facing the window and positioned above the end face of the support body, wherein the first connecting locations are heat radiation-sensitive;

the wire elements having a second connecting location positioned in an area shielded from heat radiation, wherein the second connecting locations are comparative connecting locations.

The support body has a second end face opposite the first end face. The second connecting locations are shielded by the support body and are positioned at a distance from the second end face.

The sensor may further comprise a shield that is impermeable to heat radiation, wherein the support body has a second end face opposite the first end face and the support body has second throughbores. Each wire element is guided through one of the first throughbores to the second end face and through one of the second throughbores back to the first end face. The second connecting locations are located on the first end face and are shielded by the shield.

The support body has a second end face extending opposite the first end face and parallel to the first end face, wherein the support body has a cylindrical shape or a parallelepipedal shape.

The first end face is preferably planar.

The sensor may further comprise a shield that is impermeable to heat radiation and at least one auxiliary thermocouple having a radiation-sensitive connecting location, positioned adjacent to the first end face, and a comparative connecting location, positioned adjacent to the second end face. The heat radiation-sensitive connecting location is shielded by the shield.

A plurality of the auxiliary thermocouples form one of the thermocolumns that are identical. The heat radiation-sensitive connecting locations of the auxiliary thermocouples are positioned behind the shield. The thermocolumns are connected in series in opposite polarity.

The shield has a side facing an object whose temperature is to be determined and the side is coated with a radiation-reflective coating.

The shield is heat-conductively connected to the window.

The comparative connecting locations are heat-conductively connected to one another.

The second connecting locations are heat-conductively connected to one another.

The first end face is divided into identical sectors and in each one of the sectors a group of the first or second connecting locations is arranged.

The sectors have an identical surface area and each one of the sectors has one of the thermocolumns provided thereat, the thermocolumns having identical design and being arranged identically on the sectors.

The sensor may further comprise shields impermeable to heat radiation, wherein the shields shield some of the sectors and wherein the sectors that are shielded are arranged alternatingly with those ones of the sectors that are not shielded.

The sectors are segments of a circle.

The at least one thermocolumn is positioned on the support body symmetrically to an axis extending perpendicularly to the first end face.

The first end face has a radiation-reflective layer.

The first connecting locations are coated with a radiation-absorbing coating.

The first connecting locations are coated with a radiation-absorbing black pigment.

The sensor may further comprise metallic heat radiation-absorbing surface elements, oriented toward the object whose temperature is to be measured, wherein the first connecting locations are connected to the surface elements.

The sensor may also comprise a shield that is impermeable to heat radiation for shielding the second connecting locations, wherein the second connecting locations are radiation-reflective.

Advantageously, the sensor further comprises a temperature sensor positioned in an area of the first end face exposed to heat radiation.

Expediently, the sensor further comprises a measuring line, connected to the housing at a contact location and exiting from the housing, and a compensation line, consisting of a material that is thermo-electrically active relative to the measuring line, connected at the contact location and exiting from the housing.

Preferably, the sensor includes a disk for connecting heat-conductingly the second connecting locations, wherein the disk and the support body consist of an electrically insulating material.

The housing consists of metal such as aluminum or copper.

The wire elements preferably have a length between the first and second connecting locations and a diameter. The ratio of the diameter to the length is greater than 1:100. A first one of the wire elements consists of a material having a greater heat conductivity than a second one of the wire elements. The first wire element has a smaller relative diameter than the second wire element.

The inventive sensor allows measurement in direct vicinity of the object to be measured within the interior of a hot air dryer or a heat treatment device. This is possible by using materials and connections which are resistant with respect to high temperatures (for example, up to 400° C.) so that the mechanical properties of the sensor are provided according to the desired use. Surprisingly, it was found that with the inventive sensor construction the temperature of the object to be measured can be determined very precisely, whereby the simple design of the sensor makes possible its multiple use in a heat treatment device in an economical manner so that, with acceptable expenditure and minimal cost, temperature profiles can be produced. In this context it is important that the wire elements of the thermocouples are positioned in the through openings so that they are positioned in a temperature-shielded manner and the thermocouple can deliver a high temperature voltage. The comparative connecting locations must be shielded from the heat radiation which can be realized by arrangement of the comparative connecting locations at the back side of the support body or by a heat-radiation-impermeable shield behind which the comparative connecting locations are positioned after guiding the wire elements through the support body to the back side and back.

For compensating disturbing influences, an auxiliary thermocouple may be arranged for determining the temperature gradient whereby its radiation-sensitive connecting location is positioned at the side of the base surface and the comparative connecting location is positioned at the back side phase of the support body, whereby the radiation-sensitive connecting location is arranged behind the heat radiation-impermeable shield. The thus resulting exit signal provides information in regard to the non-radiation-caused temperature difference between the groups of the connecting locations and can thus serve as a correction of the temperature difference provided by the thermocolumn.

Preferably, a plurality of auxiliary thermocouples are combined to a second thermocolumn which has the same construction and same arrangement as the first thermocolumn. The radiation-sensitive connecting locations of the second thermocolumn are positioned behind the heat radiation-impermeable shield. The second thermocolumn is switched with the first thermocolumn in opposite polarity in series so that such thermoelectric currents will cancel on another which have no radiation-related cause for the temperature difference.

In order to ensure an exact temperature measurement of the surface of an object to be measured under extreme operating conditions for diffuse heat radiation, the base surface of the support body facing the window is expediently symmetrically divided into identical sectors, for example, 2, 4, 6, 8 sectors, and in the sectors identically constructed and arranged thermocolumns are provided. The thermocolumns are switched in opposite polarity in series so that error signals will be cancelled and a highly precise output signal will be obtained.

In order to provide for an improved adjustment of the comparative connecting locations to the characteristic temperature of the sensors that corresponds to the ambient temperature and to thus increase the sensitivity by increasing the temperature difference between the groups of connecting locations, the comparative connecting locations are heat-conductively connected to one another, preferably by a heat-conducting disc.

By arranging a radiation-reflective layer on the base surface of the support body facing the heat radiation-transmissive window, on the one hand, an improved radiation exchange between the radiation-sensitive connecting locations and the object to be measured is achieved and, on the other hand, a radiation-caused heating of the support body is prevented.

For increasing the radiation-sensitive surfaces and thus for increasing the sensitivity, the radiation-sensitive connecting locations are connected by heat radiation-absorbing, especially metallic surface elements oriented toward the object to be measured.

For determining the object temperature based on the measured radiation-caused and corrected signal of the temperature difference between the two groups of connecting locations, the knowledge of the characteristic temperature of the sensor is additionally necessary. Its determination is also performed thermo-electrically by connecting, at any desired contact location of a measuring line exiting the housing, a compensation line comprised of a material that is thermo-electrically active relative to the measuring line and is also guided out of the housing.

For evaluating the temperature difference signal, the knowledge of the temperature of the sensor in the area of the radiation-sensitive connecting locations is valuable, for which purpose a temperature sensor, for example, a thermalelement is arranged.

The design of each thermalcouple of the thermalcolumn is such that the ratio of the wire diameter to the wire length between two connecting locations is greater than approximately 1:100 whereby the wire element consisting of the material of higher heat conductivity has a relatively smaller diameter. Accordingly, the radiation-caused effect on the temperature of the comparative connecting location by heat conductivity via the wire elements is minimized because the heat flow from the wire surface into the surrounding air within the through openings, respectively, into the support body is greater than the flow between the connecting locations.

BRIEF DESCRIPTION OF THE DRAWINGS

Further features of the invention may be taken from the further claims, the description and the drawing, in which embodiments of the invention are represented which will be explained in detail in the following. It is shown in:

DESCRIPTION OF PREFERRED EMBODIMENTS

Figure 1:
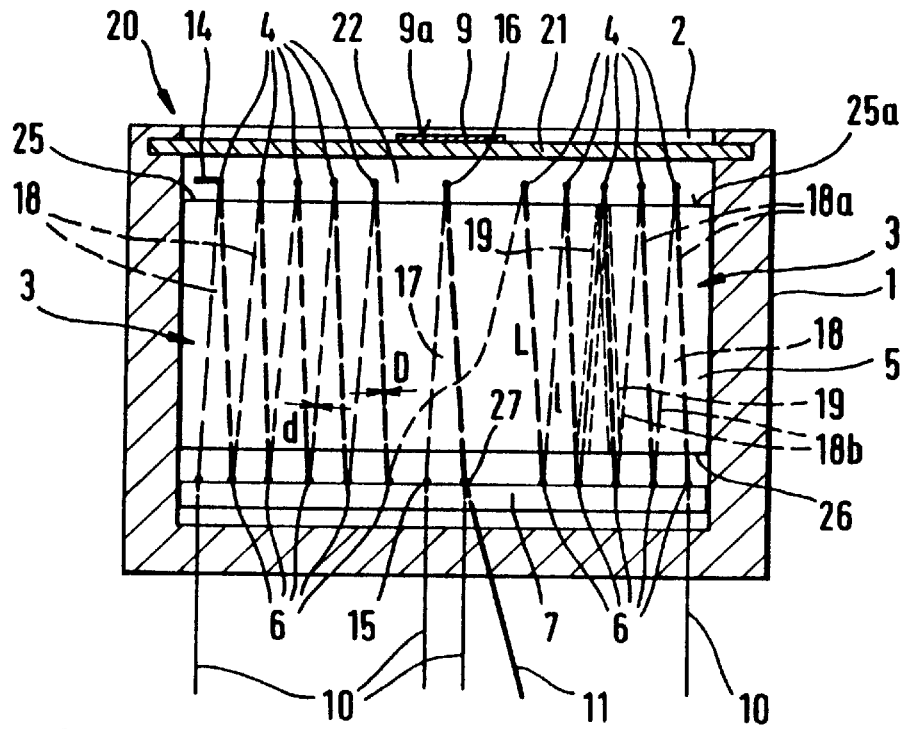
FIG. 1 a schematic design of the inventive sensor in section.

The sensor represented in FIG. 1 for radiation pyrometric temperature determination of an object to be measured is especially suitable for use in high ambient temperatures as are present in the interior of a dryer, a heat treatment device etc.

In the shown embodiment the sensor is comprised of a housing 1 with good heat-conducting properties which is preferably made of aluminum, steel or copper. When the cylindrical housing 1 is manufactured of steel, a wall thickness of 2 mm may be expedient. On one end face 20 of the cylindrical housing 1 a circular opening is provided which has expediently a diameter of 25 mm. This opening forms a window 2 which is covered by a preferably 2 mm thick radiation-transmissive disc 21. The disc is comprised especially of barium fluoride ($BaF_2$). It is transmissive for the long-wave infrared range, i.e., for heat radiation. The material of the disc is expediently germanium, silicon etc.

In the interior 22 of the metallic housing a support body 5 is arranged which is positioned expediently at the same distance to all the walls of the housing 1. The support body 5 is also of a cylindrical design according to the cylindrical housing 1 whereby the axial end faces 25, 26 extend approximately parallel to the end faces of the housing 1. The support body 5 is comprised of heat-insulating material, i.e., a material of bad heat-transmitting properties. In the shown embodiment, the support body 5 is comprised of a cement-bonded light silicate foam material with a heat conductivity of approximately 0.1 W/Km. The diameter and the height of the body are preferably identical. In the shown embodiment they are 30 mm.

In the axial direction of the support body 5 openings 19 are provided as throughbores. In the embodiment each contains a wire element 18a, 18b of a thermocouple 18. The wire elements 18a and 18b of a plurality of thermocouples 18 are switched together to form a thermo column 3 and are symmetrically distributed about the axial end face forming a planar surface 25 of the support body 5. In the embodiment according to FIG. 1, the thermocolumn 3 is comprised of 30 thermocouples 18 of a material combination nickel-chromium/nickel. The wire elements 18a have a diameter of 0.2 mm (nickel-chromium). The wire elements 18b have a diameter of 0.1 mm (Ni). The ratio of wire diameter D, respectively, d to the wire length L, respectively, l between two connecting locations 4 and 6 is greater than approximately 1:100. The wire element 18b comprised of the material having the greater heat conductivity has a relatively smaller diameter.

The first radiation-sensitive or hot connecting locations 4 of the thermocolumn 3 are symmetrically distributed on the planar base surface 25 facing the window 2. The second cold comparative connecting locations 6 are positioned at the back side 26 of the support body 5 facing away from the base surface 25. As shown in FIG. 1, the comparative connecting locations 6 are conductively connected to one another by disc 7 whereby, in order to prevent electrical short circuiting, the disc 7 is an electric insulator. In the same manner, the support body 5 is comprised of an electrically insulating material.

An auxiliary thermocouple 17 is expediently arranged in order to compensate radiation-caused disturbances. The thermocouple 17 is positioned with its radiation-sensitive connecting location 16 preferably at the center of the base surface 25 behind a heat radiation-impermeable shield 9 which is expediently fastened to the disc 21 of the window 2. The shield 9 is heat-conductingly connected to the disc 21 and is advantageously provided at the side 9a facing the object to be measured with a reflective coating. In order to obtain a temperature detection at the side of the base surface 25 that is as exact as possible, the radiation-sensitive connecting location 16 can be metallically polished, respectively, reflective.

In order to produce a high efficiency at the radiation-sensitive connecting location 4 of the thermocolumn 3, the planar base surface 25 can be embodied so as to be polished or metallically reflective. The radiation-sensitive connecting locations 4 are embodied expediently heat radiation-absorbent, for example, they are blackened with a radiation-absorbing pigment. In another embodiment the radiation-sensitive connecting locations can be connected to heat radiation-absorbing surface elements 14 that are oriented toward the object to the measured and are especially metallic.

The comparative connecting location 15 of the thermocouple 17 is preferably connected to the comparative connecting locations 6 of the thermocolumn 3 in a heat-conducting manner, for which purpose the comparative location 15 is preferably mounted on the disc 7 which is heat-conducting and electrically insulating. The disc 7 has expediently the same diameter as the support body 5.

In order to also obtain a signal representing the temperature at the back side 26 of the support body 5, at a contact location 27 of a measuring line 10 a compensation line 11 is expediently connected. It is comprised of a material that is thermo-electrically active relative to the measuring line 10 and is guided, like the measuring line 10, out of the housing 1.

With the inventive sensor output signals (thermo voltage) can be provided at the measuring lines 10, 11 which allow for an exact determination of the heat radiation impinging through the window 2 and thus a determination of the surface temperature of the object to be measured and monitored by the sensor. The inventive sensor can be used directly within the interior of the heat treatment device, i.e., in the range of high ambient temperatures of up to 400° C. All materials used are resistant to such high temperatures. It is to be assumed that the sensor temperature under such conditions is, in general, above the temperature of the object to be measured and that the measuring signal is produced by cooling of the radiation-sensitive connecting locations of the thermocolumn.

Figure 2:
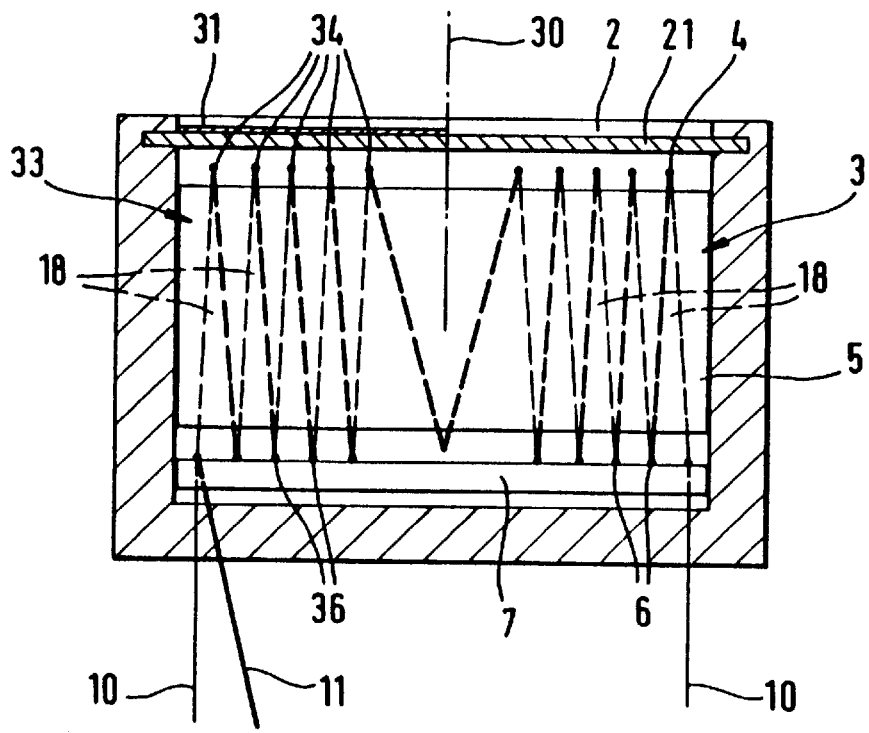
FIG. 2 in section a further embodiment of the sensor in a representation according to FIG. 1.

The sensor according to the embodiment of FIG. 2 corresponds in its basic design to that of FIG. 1 so that for same parts same reference numerals are used. In deviation from FIG. 1, a second thermocolumn 33 is arranged on the support body 5 symmetrically to a center plane 30 positioned perpendicularly to the base surface 25. The radiation-sensitive connecting locations 34 are positioned behind a shield 31 which covers half of the window 2 in a heat radiation-impermeable manner. The shield 31 is, as disclosed above, preferably embodied so as to be reflective at the outer side facing the object to be measured and is connected in a heat-conducting manner to the window 2 that supports it. The comparative connecting locations 36 as well as the comparative connecting locations 6 of the first thermocolumn 3 are connected to the heat-conducting, electrically insulating disc 7 so that the comparative connecting locations 6 and 36 of the two thermocolumns 3 and 33 are at the same temperature level. The thermocolumns 3 and 33 are switched in series with opposite polarity so that such thermo-electric currents will cancel one another whose temperature difference is not radiation-caused.

Figure 3:
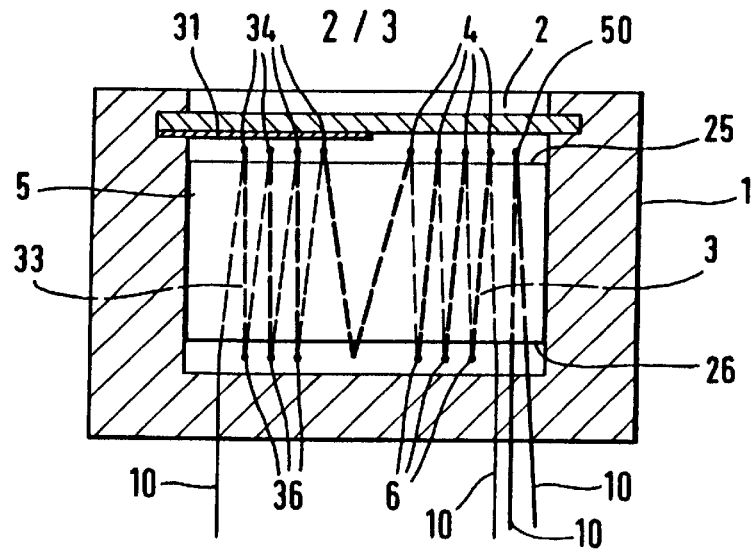
FIG. 3 in section a further embodiment of a sensor in a representation according to FIG. 1.

In FIG. 3 a further embodiment of the inventive sensor is shown which corresponds in its basic construction to FIG. 2. For same parts same reference numerals are used. In the embodiment according to FIG. 3 the heat-conducting disc for the comparative connecting locations 6 and 36 is obsolete. The shield 31 is mounted on the side of the disc 21 facing the base surface 25 whereby the side facing the object to be measured is reflective. The shield 31 can be comprised of a foil which is in heat-conducting connection to the window 2.

The base surface 25 of the support body 5 facing the window 2 is divided according to FIG. 3 into two sectors 40, 41, whereby in each sector 15 radiation-sensitive connecting locations 4 and 34 are provided. The wire elements extend, as disclosed above, in the axial direction of the support body 5 through axis-parallel bores to the back side 26 of the support body 5. The arrangement of the radiation-sensitive connecting locations 4, 34 is symmetrical to the plane 30 which extends perpendicularly to the base surface 25 and separates the sectors 40, 41 from one another.

The thermocolumns 30, 33 are switched in series in opposite polarity so that at the measuring lines 10 a compensated output signal is provided. For further compensation a thermoelement 50 is arranged at the sector 40 that is exposed to heat radiation. This output signal thus provides the actual temperature at the base side 25 of the body 5.

Figure 4:
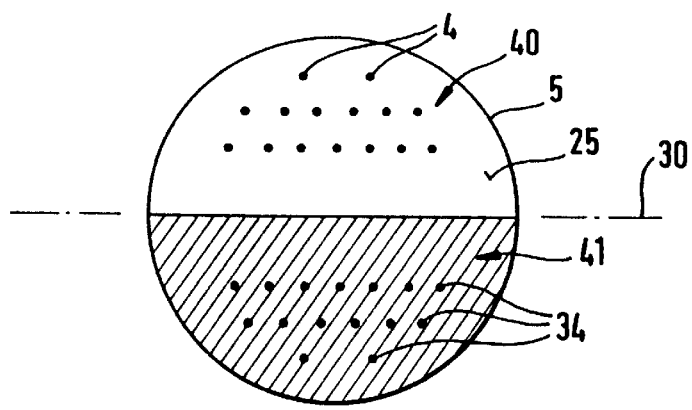
FIG. 4 a plan view of a base surface of a support body of the sensor with two thermocolumns.
Figure 5:
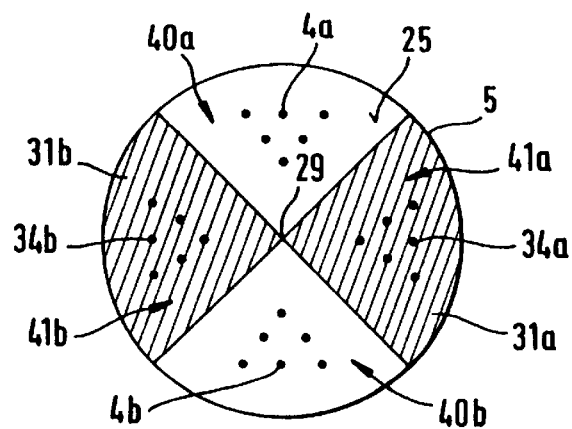
FIG. 5 a plan view of the base surface according to FIG. 4 with four thermocolumns.

An output signal which is substantially free of disturbing radiation even for diffuse heat radiation, is obtained when the base surface 25 of the support body 5 is divided into 4 identical sectors, 40a, 41a, 41b. In each sector six radiation-sensitive connecting locations 4a, 4b, respectively, 34a, 34b are arranged whereby the radiation-sensitive connecting points 34a and 34b are positioned behind a shield 31a and 31b. The sectors are arranged such that the sectors 40a and 40b, exposed to heat radiation, and the sectors 41a, 41b, shielded by the heat-impermeable shield 31a, 31b, alternate in the circumferential direction. The sectors of FIGS. 4 and 5 are segments of a circle (quarter circle, semi circle) whereby the thermocolumn exposed to heat radiation is switched in series in opposite polarity with the thermocolumn arranged behind the shield. It has been found that, by arranging four thermocolumns in the manner shown in FIG. 5 for a sensor according to FIG. 3, a very precise output signal can be obtained. The radiation-sensitive connecting locations 4a, 4b and 34a, 34b of the four thermocolumns according to FIG. 5 are positioned axis-symmetrical to the vertical axis 29 which coincides preferably with the cylinder axis of the cylindrical support body 5. It may be expedient to embody the support body 5 as a parallelepiped.

Figure 6:
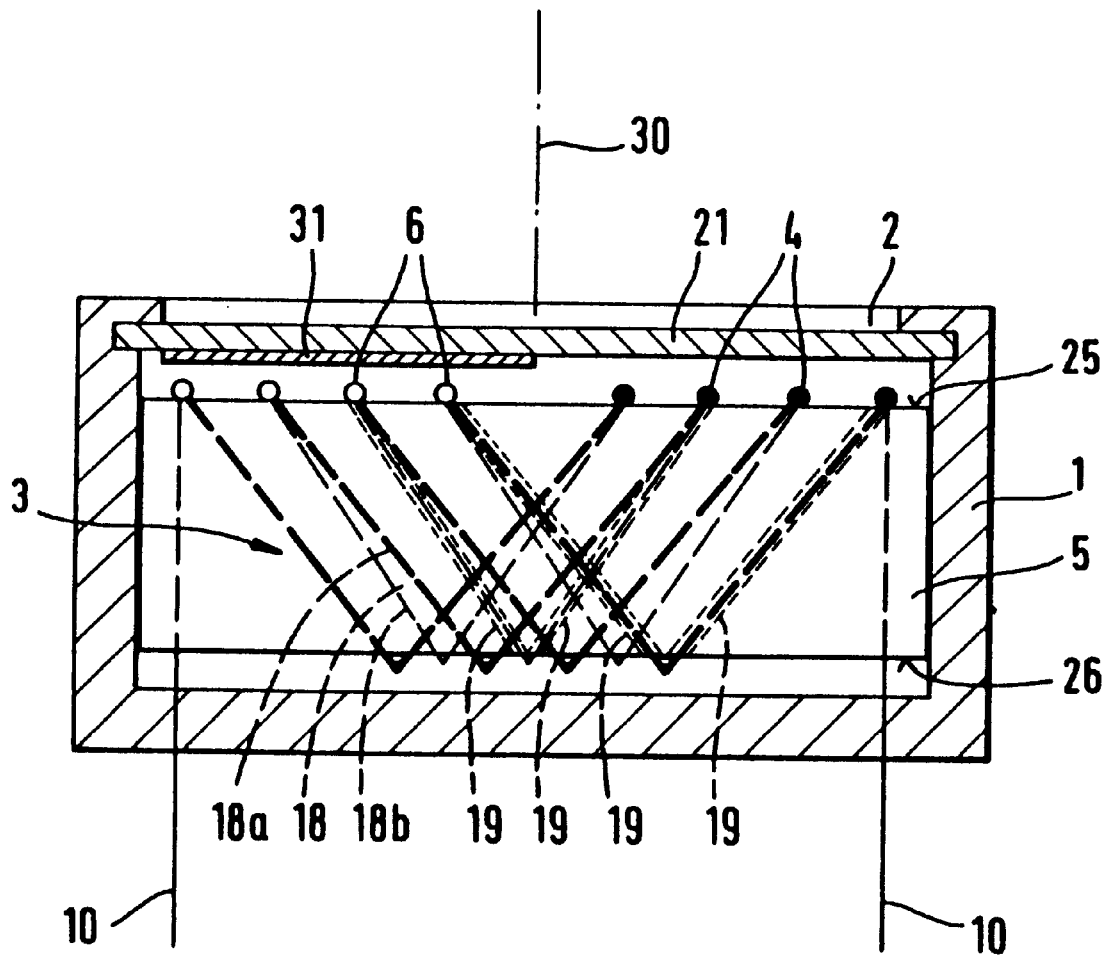
FIG. 6 in section a fourth embodiment of a sensor in a representation according to FIG. 1.

The embodiment according to FIG. 6 corresponds in its basic construction to FIG. 1, so that for same parts same reference numerals are used. The base surface 25 can be divided according to FIG. 4 by the plane 30 into two sectors 40, 41. Within the heat radiation-permeable sector 40, radiation-sensitive connecting locations 4 of the thermocolumn 3 are provided whereby the comparative connecting locations 6 are positioned at the side of the base surface 25 within the heat radiation-impermeable sector 41. The wire elements 18a, 18b of each thermocouple 18 extend through a bore 19 within the support body 5 from the base surface 25 of the sector 40 to the back side 26 and from there through a further bore 19 back to the base surface 25 into the radiation-impermeable sector 41. In such an arrangement the thermocolumn provided for compensation purposes can be omitted. A corresponding arrangement is also possible for a division into four sectors (FIG. 5) with one or two thermocolumns which are then switched in series with opposite polarity. A thermocolumn is positioned with its radiation-sensitive connecting locations 4a within the sector 40a. The comparative connecting locations of the same thermocolumn are positioned in the neighboring covered sector 41. The groups of connecting locations of the second thermocolumn are correspondingly arranged in the sectors 40b and 41b.

The present invention is, of course, in no way restricted to the specific disclosure of the specification and drawings, but also encompasses any modifications within the scope of the appended claims.

What we claim is:

1. A sensor for radiation pyrometric determination of the temperature of an object, said sensor comprising:

a heat-conducting housing having a heat-transmissive window;

at least one thermocolumn, comprised of thermocouples, arranged in said housing;

each one of said thermocouples comprised of wire elements connected to one another, said wire elements consisting of materials that are thermo-electrically active relative to one another;

a support body positioned in said housing and having a first end face facing said window;

said support body consisting of a heat-resistant, heat-insulating material;

said support body having first throughbores extending from said end face through said support body;

each one of said first throughbores receiving one of said wire elements;

said wire elements having a first connecting location facing said window and positioned above said end face of said support body, wherein said first connecting locations are heat radiation-sensitive;

said wire elements having a second connecting location positioned in an area shielded from heat radiation, wherein said second connecting locations are comparative connecting locations.

2. A sensor according to claim 1, wherein said support body has a second end face opposite said first end face and wherein said second connecting locations are shielded by said support body and are positioned at a distance from said second end face.

3. A sensor according to claim 1, further comprising a shield that is impermeable to heat radiation, wherein:

said support body has a second end face opposite said first end face;

said support body has second throughbores;

each one of said wire elements is guided through one of said first throughbores to said second end face and through one of said second throughbores back to said first end face;

said second connecting locations are located on said first end face and are shielded by said shield.

4. A sensor according to claim 1, wherein said support body has a second end face extending opposite said first end face and parallel to said first end face, wherein said support body has a cylindrical shape or a parallelepipedal shape.

5. A sensor according to claim 1, wherein said first end face is planar.

6. A sensor according to claim 2, further comprising:

a shield that is opaque to heat radiation;

at least one auxiliary thermocouple having a radiation-sensitive connecting location, positioned adjacent to said first end face, and a comparative connecting location, positioned adjacent to said second end face;

wherein said heat radiation-sensitive connecting location is shielded by said shield.

7. A sensor according to claim 6, wherein:

a plurality of said auxiliary thermocouples form one of said thermocolumns;

said thermocolumns are identical;

said heat radiation-sensitive connecting locations of said auxiliary thermocouples are positioned behind said shield; and said thermocolumns are connected in series in opposite polarity.

8. A sensor according to claim 6, wherein said shield has a side facing an object whose temperature is to be determined and said side is coated with a radiation-reflective coating.

9. A sensor according to claim 6, wherein said shield is heat-conductively connected to said window.

10. A sensor according to claim 7, wherein said comparative connecting locations are heat-conductively connected to one another.

11. A sensor according to claim 1, wherein said second connecting locations are heat-conductively connected to one another.

12. A sensor according to claim 1, wherein said first end face is divided into identical sectors and wherein in each one of said sectors a group of said first or second connecting locations is arranged.

13. A sensor according to claim 12, wherein said sectors have an identical surface area and each one of said sectors has one of said thermocolumns provided thereat, said thermocolumns having identical design and being arranged identically on said sectors.

14. A sensor according to claim 12, further comprising shields impermeable to heat radiation, wherein said shields shield some of said sectors and wherein said sectors that are shielded are arranged alternatingly with those ones of said sectors that are not shielded.

15. A sensor according to claim 12, wherein said sectors are segments of a circle.

16. A sensor according to claim 1, wherein said at least one thermocolumn is positioned on said support body symmetrically to an axis extending perpendicularly to said first end face.

17. A sensor according to claim 1, wherein said first end face has a radiation-reflective layer.

18. A sensor according to claim 1, wherein said first connecting locations are coated with a radiation-absorbing coating.

19. A sensor according to claim 1, wherein said first connecting locations are coated with a radiation-absorbing black pigment.

20. A sensor according to claim 1, further comprising metallic heat radiation-absorbing surface elements, oriented toward the object whose temperature is to be measured, wherein said first connecting locations are connected to said surface elements.

21. A sensor according to claim 1, further comprising a shield that is impermeable to heat radiation for shielding said second connecting locations, wherein said second connecting locations are radiation-reflective.

22. A sensor according to claim 1, further comprising a temperature sensor positioned in an area of said first end face exposed to heat radiation.

23. A sensor according to claim 1, further comprising:

a measuring line connected to said housing at a contact location and exiting from said housing; and a compensation line, consisting of a material that is thermo-electrically active relative to said measuring line, connected at said contact location and exiting from said housing.

24. A sensor according to claim 1, further comprising a disk for connecting heat-conductingly said second connecting locations, wherein said disk and said support body consist of an electrically insulating material.

25. A sensor according to claim 1, wherein said housing consists of metal.

26. A sensor according to claim 25, wherein said metal is aluminum or copper.

27. A sensor according to claim 1, wherein:

said wire elements have a length between said first and second connecting locations and a diameter;

a ratio of said diameter to said length is greater than 1:100;

a first one of said wire elements consists of a material having a greater heat conductivity than a second one of said wire elements;

said first wire element has a smaller relative diameter than said second wire element.

* * * * *